US012614369B2

(12) United States Patent
Vyas et al.

(10) Patent No.: US 12,614,369 B2
(45) Date of Patent: Apr. 28, 2026

(54) MACHINE-LEARNING MODELS TRAINED TO MODIFY IMAGE ILLUMINATION WITHOUT GROUND-TRUTH IMAGES

(71) Applicant: Samsung Electronics Co., Ltd., Suwon-si (KR)

(72) Inventors: Kushal Kardam Vyas, Santa Clara, CA (US); Kathleen Sofia Hajash, Sunnyvale, CA (US); Sajid Sadi, San Jose, CA (US); Sergio Perdices-Gonzalez, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 18/116,686

(22) Filed: Mar. 2, 2023

(65) Prior Publication Data

US 2023/0290108 A1      Sep. 14, 2023

Related U.S. Application Data

(63) Continuation-in-part of application No. 17/856,693, filed on Jul. 1, 2022, now Pat. No. 12,211,189.

(Continued)

(51) Int. Cl.
*G06V 10/60*        (2022.01)
*G06V 10/74*        (2022.01)
*G06V 10/82*        (2022.01)

(52) U.S. Cl.
CPC ............ *G06V 10/60* (2022.01); *G06V 10/761* (2022.01); *G06V 10/82* (2022.01)

(58) Field of Classification Search
CPC ...... G06V 10/60; G06V 10/761; G06V 10/82; G06V 10/774; G06T 2207/20012;

(Continued)

(56) References Cited

U.S. PATENT DOCUMENTS 8,503,800 B2 *    8/2013    Blonk .................. G06V 40/167
                                                                    382/226
10,248,844 B2    4/2019    Kim
                    (Continued)

FOREIGN PATENT DOCUMENTS

CN        104008364 A    8/2014
CN        109190521 A    1/2019
                    (Continued)

OTHER PUBLICATIONS

Notice of Allowance in U.S. Appl. No. 17/856,693, Sep. 26, 2024.
                    (Continued)

*Primary Examiner* — Stephen R Koziol
*Assistant Examiner* — Michael Kim Maiden

(57)        ABSTRACT

In one embodiment, a method of training a machine-learning model for modifying a facial illumination in an image includes accessing an initial image including a human face having an initial illumination and determining one or more illumination priors for the initial image. The method includes providing the initial image and the one or more illumination priors to the machine-learning model; receiving, from the machine-learning model, a set of correction operators identifying a modified illumination for the human face; creating, based at least on the set of correction operators and the initial image, a modified image having the modified illumination; creating, based on the modified image, a reconstructed initial image including the human face having a reconstructed illumination; and adjusting one or more parameters of the machine-learning model by minimizing a loss function based on a difference between the initial and the reconstructed initial images in their respective illumination.

30 Claims, 5 Drawing Sheets

Related U.S. Application Data

(60) Provisional application No. 63/351,051, filed on Jun. 10, 2022, provisional application No. 63/318,638, filed on Mar. 10, 2022.

(58) Field of Classification Search
CPC . G06T 2207/20081; G06T 2207/20084; G06T 2207/30201; G06T 5/60; G06T 5/94
See application file for complete search history.

(56) References Cited

U.S. PATENT DOCUMENTS

| | | | |
|---|---|---|---|
| 10,565,686 B2 | 2/2020 | Lehtinen | |
| 10,692,265 B2 | 6/2020 | Hadap | |
| 10,740,959 B2 | 8/2020 | Johnson | |
| 10,936,909 B2 | 3/2021 | Sunkavalli et al. | |
| 11,978,181 B1 | 5/2024 | Pieper | |
| 2020/0015575 A1 | 1/2020 | Fu | |
| 2020/0143230 A1 | 5/2020 | Su | |
| 2020/0273237 A1 | 8/2020 | Sunkavalli et al. | |
| 2020/0311878 A1 | 10/2020 | Matsuura | |
| 2020/0320748 A1 | 10/2020 | Levinshtein et al. | |
| 2020/0410270 A1 | 12/2020 | Naruse et al. | |
| 2021/0264576 A1* | 8/2021 | Sun | G06T 5/94 |
| 2022/0014684 A1 | 1/2022 | Zhou | |
| 2022/0027659 A1 | 1/2022 | Legendre | |
| 2022/0067450 A1 | 3/2022 | Verma | |
| 2022/0101596 A1* | 3/2022 | Volkov | G06T 19/20 |
| 2022/0155232 A1 | 5/2022 | Liu | |
| 2022/0157012 A1* | 5/2022 | Ghosh | G06N 3/088 |
| 2023/0360182 A1* | 11/2023 | Fanello | G06T 5/92 |

FOREIGN PATENT DOCUMENTS

| | | |
|---|---|---|
| CN | 107909640 B | 7/2020 |
| CN | 111798384 A | 10/2020 |
| CN | 112052703 | 12/2020 |
| CN | 112132743 A | 12/2020 |
| CN | 113240622 A | 8/2021 |
| CN | 112131975 A | 11/2022 |
| JP | 2023039499 | 3/2023 |
| KR | 10-2022-0001417 A | 1/2022 |
| WO | WO 2022-099322 A1 | 5/2022 |

OTHER PUBLICATIONS

PCT Search Report and Written Opinion in PCT/KR2023/003323, Jun. 7, 2023.

PCT Search Report and Written Opinion in PCT/KR2023/002924, Jun. 30, 2023.

Mahmoud Afifi, 'Semantic White Balance: Semantic Color Constancy Using Convolutional Neural Network', Feb. 1, 2018.

Deep Single-Image Portrait Relighting—Hao Zhou and Sunil Hadap and Kalyan Sunkavalli and David W. Jacobs; International Conference on Computer Vision (ICCV) Oct. 2019.

Gharbi, Michael, et al., "Deep Bilateral Learning for Real-Time Image Enhancement," Siggraph 2017, ACM Transactions on Graphics, vol. 36, No. 4, Article 118. Publication date: Jul. 2017, 0730-0301/2017/7-ART118, DOI: http://dx.doi.org/10.1145/3072959.3073592, https://groups.csail.mit.edu/graphics/hdrnet/data/hdrnet.pdf, 12 pages.

Apple Portrait Mode Lighting Effect (https://support.apple.com/en-us/HT208118), Downloaded from web Dec. 8, 2022.

SfSNet: Learning Shape, Reflectance and Illuminance of Faces 'in the wild' Soumyadip Sengupta Angjoo Kanazawa Carlos D. Castillo David W. Jacobs (https://arxiv.org/pdf/1712.01261.pdf), Apr. 19, 2018.

Pandey, Rohit, et al., "Total Relighting: Learning to Relight Portraits for Background Replacement," ACM Transactions on Graphics, vol. 40, Issue 4, Aug. 2021 (Online: Jul. 19, 2021), Article No. 43, https://doi.org/10.1145/3450626.3459872, https://augmentedperception.github.io/total_relighting/total_relighting_paper.pdf, pp. 1-21.

Tsai, Yun-Ta, et al., Portrait Light: Enhancing Portrait Lighting with Machine Learning, Google AI Blog, https://ai.googleblog.com/2020/12/portrait-light-enhancing-portrait.html, 7 pages, Dec. 11, 2020.

Sengupta, Soumyadip, et al. "A Light Stage on Every Desk," Submitted on May 17, 2021 (v1), last revised Nov. 11, 2021 (this version, v2), arXiv:2105.08051v2 [cs,CV]2105.08051, https://arxiv.org/pdf/2105.08051.pdf, 25 pages.

Extended European Search Report in Application No. 23767209.2-1207 / 4413525 PCT/KR2023003323, Jan. 15, 2025.

Nestmeyer Thomas et al., "Learning Physics-Guided Face Relighting Under Directional Light", 2020 IEEE/CVF Conference on Computer Vision and Pattern Recognition (CVPR), Apr. 19, 2020, pp. 5123-5132, XP093076192, DOI: 10.1109/CVPR42600.2020.00517 ISBN: 978-1-7281-7168-5. Retreived from the Internet: https://arxiv.org/pdf/1906.03355.pdf.

Yoshihiro Kanamori et al.: "Relighting humans", Dec. 4, 2018; Dec. 4, 2018-Dec. 7, 2018, Dec. 4, 2018, pp. 1-11, XP058421461, DOI: 10:1145/3272127.3275104; ISBN: 978-1-4503-6008-1.

Extended European Search Report in Application No. 23767085.6-1218 / 4463819 PCT/KR2023002924, Mar. 17, 2025.

* cited by examiner

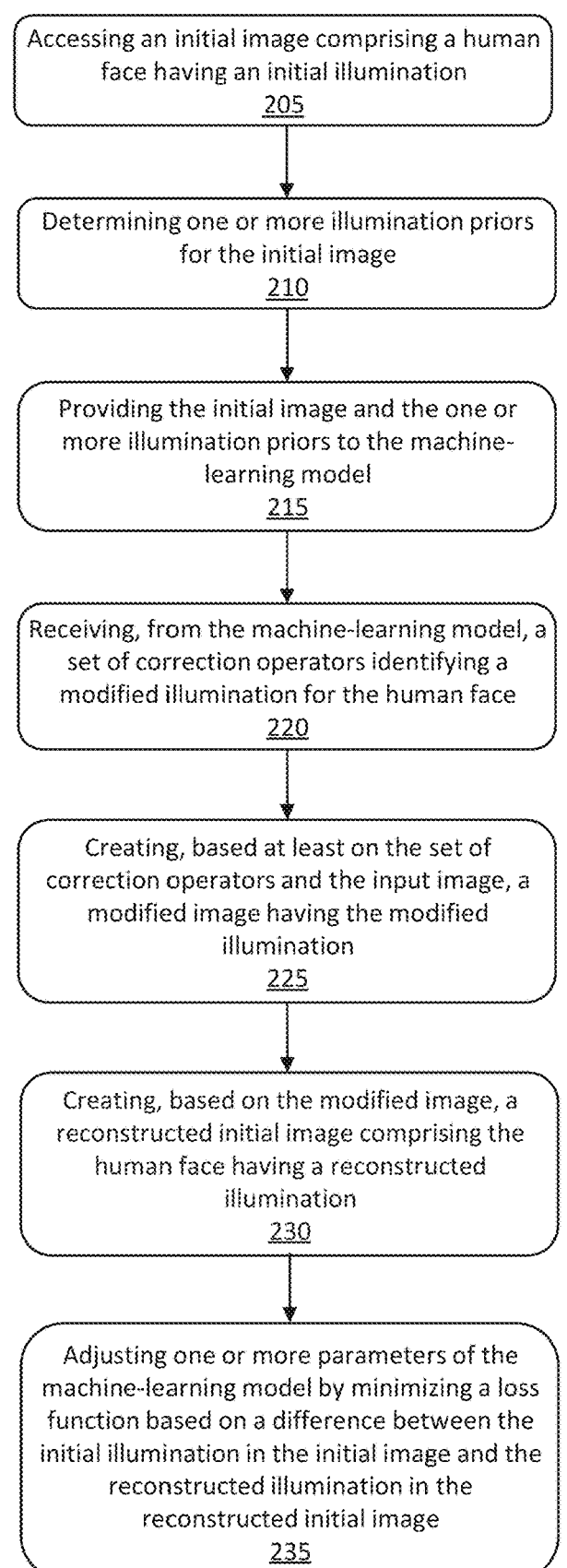

Accessing an initial image comprising a human
face having an initial illumination
205

Determining one or more illumination priors
for the initial image
210

Providing the initial image and the one or
more illumination priors to the machine-
learning model
215

Receiving, from the machine-learning model, a
set of correction operators identifying a
modified illumination for the human face
220

Creating, based at least on the set of
correction operators and the input image, a
modified image having the modified
illumination
225

Creating, based on the modified image, a
reconstructed initial image comprising the
human face having a reconstructed
illumination
230

Adjusting one or more parameters of the
machine-learning model by minimizing a loss
function based on a difference between the
initial illumination in the initial image and the
reconstructed illumination in the
reconstructed initial image
235

Fig. 2

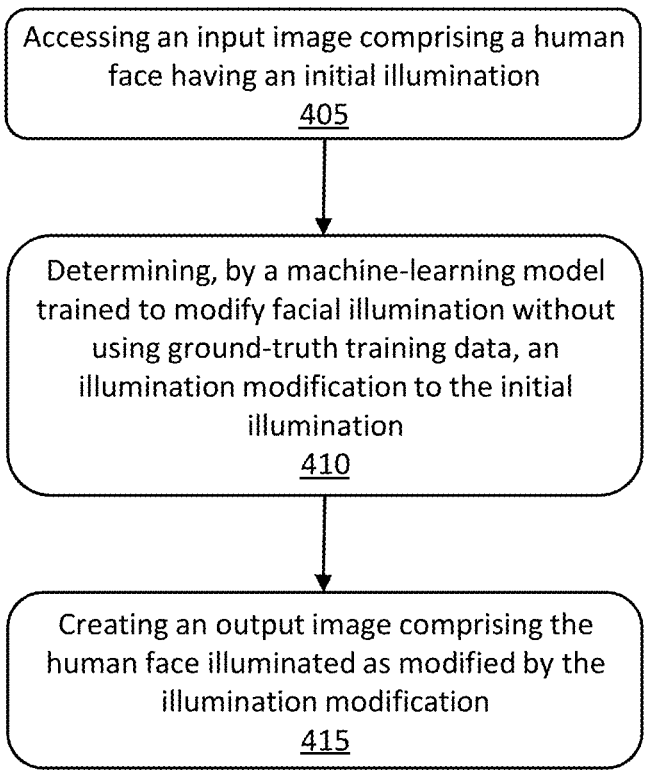

Accessing an input image comprising a human
face having an initial illumination
405

Determining, by a machine-learning model
trained to modify facial illumination without
using ground-truth training data, an
illumination modification to the initial
illumination
410

Creating an output image comprising the
human face illuminated as modified by the
illumination modification
415

Fig. 4

MACHINE-LEARNING MODELS TRAINED TO MODIFY IMAGE ILLUMINATION WITHOUT GROUND-TRUTH IMAGES

PRIORITY CLAIM

This application claims the benefit under 35 U.S.C. § 119 of U.S. Provisional Patent Application No. 63/351,051 filed Jun. 10, 2022, which is incorporated herein by reference. This application also is a continuation-in-part of, and claims the benefit under 35 U.S.C. § 120 of, U.S. patent application Ser. No. 17/856,693 filed Jul. 1, 2022, which claims the benefit under 35 U.S.C. § 119 of U.S. Provisional Patent Application No. 63/318,638 filed Mar. 10, 2022, both of which are incorporated herein by reference.

TECHNICAL FIELD

This application generally relates to model architectures and model training for machine-learning models used to modify image illumination without requiring ground-truth images.

BACKGROUND

Smartphones and other camera-based devices have become an important part of many users' photography experience. However, in many cases the quality of a photograph, such as a portrait photograph, is dependent on external factors that are not controllable by the user, such as bad environment lighting, uneven shadows, strong directional lights, etc., making it difficult for a user to capture high-quality images. In addition, lighting conditions are often not changeable without specialized tools, such as for example studio lights, reflectors, diffusers, advanced photo-editing software, etc., which most users do not have or are not practical to use for many use cases.

BRIEF DESCRIPTION OF THE DRAWINGS

FIG. 2 illustrates an example method of training a machine-learning model for modifying a facial illumination in an image.

FIG. 4 illustrates an example method of modifying the illumination of a human face in an initial image, using a machine-learning model that is trained without using ground-truth training data.

DESCRIPTION OF EXAMPLE EMBODIMENTS

Machine-learning models may be used to modify the lighting in a photograph, such as for example in a portrait photograph, that includes one or more human (or hominid, humanoid, etc.) faces in the photograph. For example, U.S. patent application Ser. No. 17/856,693, which is incorporated herein by reference, describes several examples of lightweight machine-learning models that may be used to modify the illumination of one or more human faces in an input portrait image. For example, FIG. 18 of U.S. patent application Ser. No. 17/856,693, reproduced as FIG. 1 herein, illustrates an example machine-learning model (e.g., correction network) used to modify the illumination of one or more human faces in an input image by learning correction operators A, b that can be used to modify (e.g., correct) the lighting of the human face(s) in the image.

Figure 1:
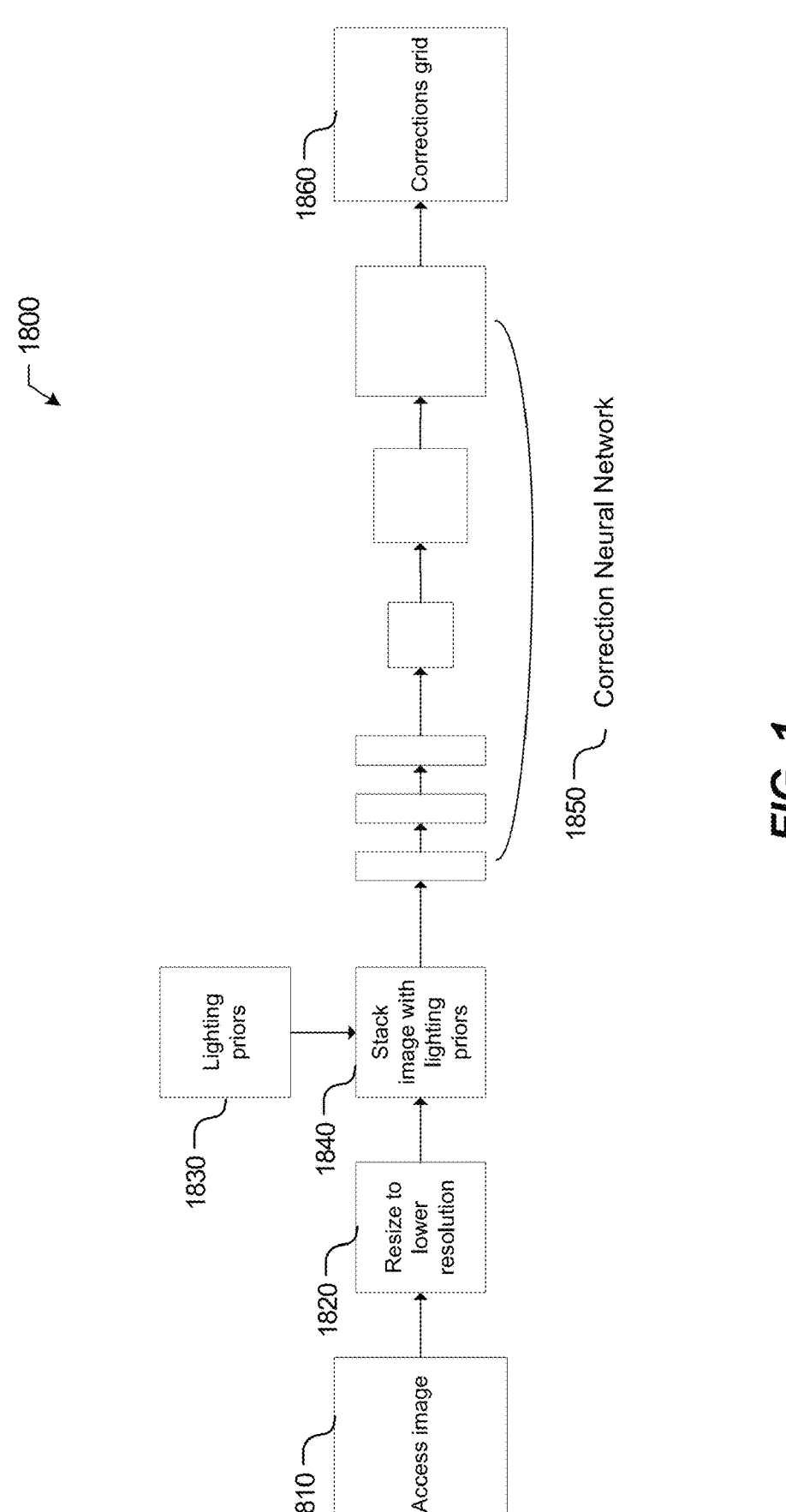
FIG. 1 illustrates an example machine-learning model used to modify the illumination of one or more human faces in an input image by learning correction operators.

As illustrated in FIG. 1, step 1810 includes accessing an image, which may be an RGB image, a YCbCr image, or an image having any other suitable colorspace representation. In the example of FIG. 1, step 1820 includes reducing the image to a lower resolution. For example, the image may be reduced to a resolution of 256×256. Step 1830 includes accessing lighting priors, such as the shading, and stacking the image with the lighting priors, e.g., by adding those priors as one or more channels to the image. The stacked image is input to the example correction neural network 1850 of FIG. 1, which generates corrections grid 1860. For example, correction neural network 1850 may be a collection of convolution and dense layers. Correction neural network 1850 may be relatively small, i.e., have relatively few layers/parameters relative to typical neural networks. For example, correction neural network 1850 learns correction operators A, b that are used to modify image lighting, rather than learning the actual output pixels themselves, which reduces model size. In addition, in the example of FIG. 1, correction neural network 1850 operates on a relatively lower resolution image, which reduces model size. As a result, and as discussed more fully in U.S. patent application Ser. No. 17/856,693, the lightweight machine-learning model may be used in consumer devices, e.g., a smartphone, to provide near real-time lighting modifications to a human face in an image. Modifications may include correcting poor illumination, such as uneven lighting or soft shadows. Modifications may also include adding lighting effects, such as adding directional lighting or cinematic lighting effects that are not present in the image as captured.

As described in U.S. patent application Ser. No. 17/856, 693, corrections grid 1860 may be represented as a GD×GH×GW×GP tensor, where GH indicates the grid height and GW indicates the grid width, which together represents the spatial region of the image being operated on. GD indicates the binning of the input pixel intensity, i.e., the number of bins into which the input intensity is organized. The values across the bins represented by GD span the intensity values of the input image. GP indicates the number of per-pixel correction operations needed, which in the example of a single-channel image (e.g., corresponding to FIG. 19 of U.S. patent application Ser. No. 17/856,693) GP=2, for scale and offset (correction operators A, b). The example correction neural network 1850 may be expressive in what the network is able to model, given that GD is a controllable parameter in the model. Once the corrections grid is determined for an input image, the correction may be applied to the higher-resolution input image (e.g., to the portion of the input image that corresponds to human faces) to modify the lighting of the human faces within the input image. For example, as discussed in U.S. patent application Ser. No. 17/856,693, for each pixel in the image, the corrections from nearby grid cells may be trilinearly interpolated to compute the final illumination correction for that image pixel, and the correction may then be applied to the image pixels for the region of the image spanned by GH, GW.

Training a machine-learning model, such as the example correction neural network 1850 of FIG. 1, to correct illumination in an input image typically requires a supervised learning methodology, where each input image is paired with at least one ground-truth image in which the desired lighting corrections have already been made. For example, for the task of portrait illumination control, i.e., controlling the lighting of a portrait photograph, the input data may be a portrait image captured by a camera device, such as a smartphone. The input image may have poor illumination, shadows, directional lights, etc., and the ground truth would be an ideal image with well-balanced illumination or an image with a particular type of desired illumination. A machine learning model is then trained using these input and ground-truth pairs of image data, so that the machine-learning model learns a transformation that can modify the illumination in the input image to produce an image identical to, or very close to, the ground-truth image.

The supervised machine-learning approach requires capturing the input data and ground truth, such that they are (i) shot of the same scene and subject, (ii) pixel-to-pixel aligned, and (iii) have no differences between them, other than illumination. Such data is usually difficult and costly to capture, regardless of whether a hardware-based or software-based approach is used.

This disclosure describes methods and systems for training a machine-learning model that modifies facial illumination in images without requiring paired ground-truth data. Since paired ground-truth data does not need to be generated, these methods and systems significantly reduce the technical challenges and resources required to train a machine-learning model that modifies illumination of faces in images, and requires only a poorly-lit image as input. For example, if 12 MB images are input for training a machine-learning model, and training is performed on e.g., 5,000 images, then embodiments disclosed herein provide at least a 12 MB×5,000=60 GB improvement in data complexity required to train the model. Moreover, many models use even more images for training and/or images having a larger data size. In addition, in this example, embodiments herein remove the time, equipment, and resources required to gather at least 5,000 ground-truth images.

Given an image I, a machine-learning model M, and one or more priors P on illumination such as shading S, surface normals N, and lighting L, the expected illumination output Î is defined as:

$$\hat{I}=M(I,P) \tag{1}$$

The machine-learning model M may be any suitable machine-learning model, such as a neural network, including but not limited to the correction networks described herein or described in U.S. patent application Ser. No. 17/856,693. Thus, give an image I having some source lighting, the machine-learning model M outputs illumination modifications for an output image Î having modified (e.g., corrected) lighting. In supervised machine learning systems, the output of the machine learning model Î would be compared to a ground-truth, modified image $\widehat{I_{GT}}$ having modified lighting and supplied as input to the machine-learning model, and the error between Î and $\widehat{I_{GT}}$ would be back propagated to train the machine learning model. However, as explained above, the systems and methods disclosed herein train the machine-learning model without requiring paired ground-truth images to be created and provided as training input.

As mentioned above, one or more priors such as shading S, surface normals N, and lighting L may be determined for an input image. Likewise, for the output image Î, one or more features such as modified shading S, modified lighting L̂, and normals N may be determined. For an image I of a human face, the image formation can be described as:

$$I=a\cdot f(N,L) \tag{2}$$

4 where a is the albedo for each pixel, and albedo is the color of an object/pixel in diffused illumination; N is the surface normal for each pixel in the captured image; L is an element environment lighting vector (e.g., a 9×3 element environment lighting vector) parameterized by spherical harmonics, and L can be monochromatic (grayscale) or RGB or YCbCr (or any other relevant image color space); and $f$ is the reflectance function. The reflectance function may be a Lambertian reflectance function, where reflectance is the measure of an object's effectiveness in reflecting light. $f(N,L)$ yields a shading for the image, i.e. shading S for an image may be represented by $S=f(N, L)$. As used herein, a shading is the perceived variation of illumination reflected by the object as captured by a camera (in the direction of the camera). For simplicity, certain embodiments assume that the reflectance function is Lambertian in nature, but other reflectance functions may be used, as well. In particular embodiments, reference to the image I may be used to refer to the portion of an image that is a human face.

As shown in equation 2, a rendered image can be described by the albedo and shading (as inferred from the light of the scene). If a scene is rendered with two separate lightings $L_1$ and $L_2$, resulting in images $I_1$ and $I_2$, then:

$$I_1=a\cdot f(N,L_1) \tag{3}$$

$$I_2=a\cdot f(N,L_2) \tag{4}$$

Here, the rendered image is solely dependent on the illumination of the scene, because the albedo a and normals of the scene N remain the same across different lighting, for the same scene/subject/object in the image. Therefore, we can factor out the albedo in both equations, yielding:

$$\frac{I_1}{I_2} = \frac{f(N, L_1)}{f(N, L_2)} \tag{5}$$

where $f(N, L_i)$ is the shading for that particular lighting and set of surface normals. In particular embodiments, and for simplicity, in places where there may be NaNs (not-a-number), or divide by zero cases, the ratio in equation 5 may be given the value 0.

Using equation (5), one can express an image in one lighting to be equivalent to an image in another lighting using the ratio of their respective shadings by:

$$I_1 = I_2\cdot\frac{f(N, L_1)}{f(N, L_2)} \tag{6}$$

which may be referred to as the "ratio image formulation" or "ratio formulation." Given that the quantity $f(N, L)$ is the shading S of an image for a particular lighting L and its surface normals N, the ratio formulation can be used interchangeably given a source or a target image, where:

$$I_{target} = I_{source}\cdot\frac{f(N, L_{target})}{f(N, L_{source})} \tag{7}$$

is equivalent to:

$$I_{target} = I_{source}\frac{S_{target}}{S_{source}} \tag{8}$$

and equations (7) and (8) may be arranged, respectively, as:

$$I_{source} = I_{target} \cdot \frac{f(N, L_{source})}{f(N, L_{target})} \quad (9)$$

$$I_{source} = I_{target} \cdot \frac{S_{source}}{S_{target}} \quad (10)$$

In this disclosure, $L_{source}$ is the source lighting of an initial (or input) image I, and $L_{target}$ is the corrected lighting in the modified image $\hat{I}$. After obtaining the image $\hat{I}$, a reconstruction of the initial, source image I can be created from the modified image $\hat{I}$ by using equation 10. This reconstructed image (or reconstructed initial/input image) is referred to as I'. Once the reconstructed image I' is obtained, the machine-learning model M can be trained by applying a loss between the input image I and the reconstructed input image I' (or more specifically, in particular embodiments, between the portions of those images for which a mask (for example, a set of normals N) is determined to correspond to human facial features within the image). For example, a loss function may be:

$$\text{Loss} = \|I - I'\| + \text{regularization} \quad (11)$$

where the loss function may be, but is not limited to, an $L_1$ loss. In particular embodiments, as illustrated in equation 11, a regularization term may be added to the loss function to penalize overfitting by the model M. The gradient to minimize this loss function is computed based on this loss, with respect to the machine-learning model's parameters, and the weights and biases of the model are updated accordingly. The model is trained using multiple input images and for multiple iterations to obtain a final trained model, all without paired ground-truth images being used. It should be noted that $\hat{I}$ is the output from the entire machine-learning system with the desired illumination identified by $L_{target}$. That being said, the process of reconstructing I' from $\hat{I}$ using equation (6) is a way to avoid the need for ground-truth images when training the system. Thus, by training the machine-learning model without ground truth images, and by computing the loss between the input image and its reconstruction, particular embodiments implicitly learn the output/image with the desired illumination.

In particular embodiments, given the nature of the approximation in computing the albedo in equation (1) (i.e., the albedo being computed as the median of pixels), the computed lighting vector $L_{source}$ may incorporate a degree of chromatic information from the input portrait image. However, the target lighting vector $L_{target}$ is ambient and monochrome. Thus, the monochrome target lighting vector may be written as $$L_{target}^{monochrome}.$$

Relevant quantities such as shading likewise may be written as $S_{target}$ and $$S_{target}^{monochrome}$$

respectively. To adapt the monochromatic target lighting to provide an ambient yet chromatically correct target lighting suited for the image, particular embodiments may apply adaptive instance normalization (AIN) to the monochrome shading $$S_{target}^{monochrome}$$

in order to compute a chromatically correct target shading $S_{target}$, for example according to:

$$S_{target} = AIN\left(S_{target}^{monochrome}, S_{source}\right) = \frac{S_{target} - \mu_{target}}{\sigma_{target}} \cdot \sigma_{source} + \mu_{source} \quad (12)$$

where $S_{target}$ is the target shading obtained by adapting a monochrome ambient lighting to match the input image's chromatic statistics; $S_{source}$ is the source shading obtained by Eq (1);

$$S_{target}^{monochrome}$$

is an initial monochromatic shading obtained from a known ambient lighting vector $L_{target}$; $\mu_{source}$ is the mean of the source shading $S_{source}$; $\mu_{target}$ is the mean of the target shading $$S_{target}^{monochrome};$$

$\sigma_{source}$ is the variance of the source shading $S_{source}$, and $\sigma_{target}$ is the variance of the target shading $$S_{target}^{monochrome}.$$

Thus, the ratio formula and AIN may be used to determine the reconstructed image for evaluating the loss function with respect to the initial image, e.g., as shown in equation 11.

In particular embodiments, an input image I is a poorly lit image, for example an image that includes uneven shadows or other artifacts due to poor lighting conditions, and $\hat{I}$ is a modified image that corrects/improves the lighting in the input image I. In other embodiments, I may simply be an input image, including a well-lit input image, and $\hat{I}$ may be an output image having some desired lighting modification. For example, a user may want to modify a well-lit image of a face to add some directional lighting or cinematic lighting, e.g., by adding lighting that appears to come from a particular direction (e.g., from the left or right of the face in the image). In these latter embodiments, $L_{source}$ is the source lighting that is ambient and $L_{target}$ is the desired directional/cinematic target lighting. The training procedure proceeds as described above, expect that the computed priors here are based on the initial image/and are based on the target lighting $L_{target}$.

For example, in embodiments discussed above where the input image has lighting artifacts to be corrected, the illumination prior P is computed using the source lighting of the image $L_{source}$. As a result, the source shading image $S_{source}$ resembles the shading image of the input image. The illumination prior P, which is input to the neural network, is indicative of the illumination information of the input image (for example, lighting information or shading information, etc.), and the trained network produces a correction grid that corrects the input image to an ambient one. In contrast, in embodiments where the input image's lighting does not need to be corrected but a user wishes to modify the image lighting, e.g., to produce directional or cinematic lighting, then the illumination prior P is adapted from the target lighting $L_{target}$, which identifies the kind of modified lighting that the user wishes to apply. As a result, the illumination prior P is indicative of the desired illumination, and a network trained to produce enhanced images produces a correction grid that enhances the illumination of the input image to be more directional and/or cinematic. In particular embodiments, a network that corrects an input image to produce an image with corrected ambient lighting is different than a network that adds cinematic or other enhanced lighting. As an example of applying enhanced lighting to an image, a user may input a desired shading or lighting effect to apply to an image, for example by selecting from one or more of a predetermined set of shading or lighting effects presented to the user. In particular embodiments, the lighting of an input image may be modified to both correct the lighting and to add enhanced lighting. For example, in these embodiments an image may first be passed through a network trained to correct ambient lighting, which uses a prior P that is based on $L_{source}$, and the resulting corrected image may then be passed to a second network trained to enhance the image, which uses a prior P that is based on $L_{target}$.

In order to compute P on $L_{target}$ rather than $L_{source}$, particular embodiments compute $L_{source}$ as a known ambient illumination lighting vector, and $$L_{target}^{monochrome}$$

as the desired monochromatic directional/cinematic lighting vector (represented in spherical harmonic coefficients). Next, particular embodiments compute the source shading, monochromatic target shading, and target shadings $S_{source}$, $$S_{target}^{monochrome},$$

and $S_{target}$ respectively. As described above, the source ambient illumination lighting vector may have chromatic components due to the approximate nature of the albedo estimate, and therefore to ensure a chromatically correct $S_{target}$, particular embodiments use the AIN representation showing in equation 12.

Figure 5:
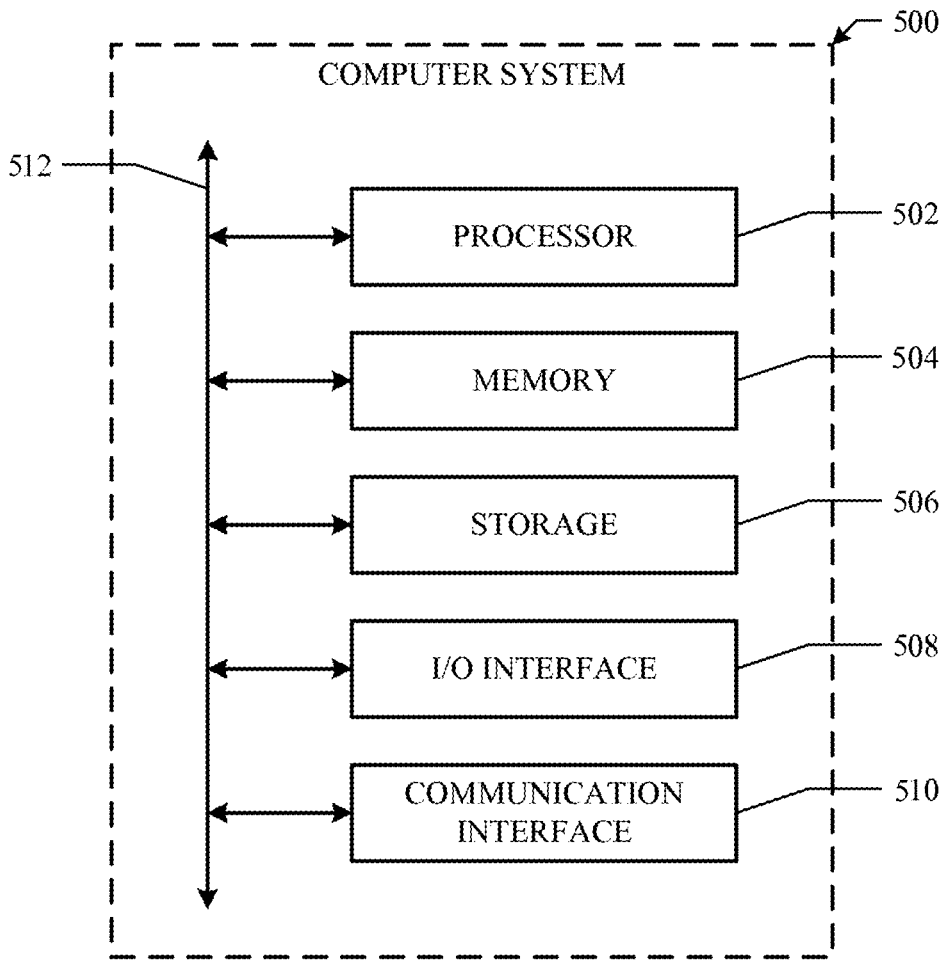
FIG. 5 illustrates an example computer system.

Particular embodiments may modify image illumination for image frames of a video. For example, in one approach particular embodiments may treat each video frame as an independent image and apply modifications to each frame. However, the resulting modifications may not have a smooth or completely coherent visual appearance across frames of the videos. As an example of another approach, particular embodiments compute, for each image frame in the video, the 3D facial landmarks, e.g., as shown in FIG. 5 of U.S. patent application Ser. No. 17/856,693, and track those facial landmarks across the frames in the video. For example, such embodiments may begin by selecting a keyframe of the video and saving the face landmarks of that keyframe. Next, illumination priors for that keyframe may be determined, and the keyframe is input to a trained machine-learning model for modifying image lighting. As a result, the model outputs the modified illumination for the keyframe and populates the correction grid of illumination correction coefficients for the given keyframe.

The correction grid spatially corresponds to the image's pixel space, i.e., as illustrated in the following equation illustrating how the correction scales A and b are applied to each pixel at location (u, v,) of an input image/to create the modified image Î:

$$\hat{I}(u, v) = A(u', v,' \ I(u, v)') \cdot I(u, v) + b(u', v,' \ I(u, v)') \tag{13}$$

where (u', v', I(u, v)') is the scaled image pixel coordinates and intensity values to map to the grid dimensions GW, GH, and GD. Equation 13 can be represented more broadly as equation (1), above. Particular embodiments use the tracked landmarks within other video frames to directly lookup the illumination correction for the other frames, without having to propagate the other video frames to the machine learning model/neural network. As an example, consider 2 video frames $K_1$ and $K_2$. If $K_1$ is a keyframe, then it undergoes the same process as a single image would undergo when modifying the lighting of an image. $K_2$ is another video frame such that all common pixels between $K_1$ & $K_2$ get displaced by $\delta_u$, $\delta_v$ in the image's u, v axes.

$K_1$ undergoes the following transformation:

$$\hat{I}_{K1}(u, v) = A(u', v', I_{K1}(u, v)') \cdot I_{K1}(u, v) + b(u', v', I_{K1}(u, v)') \tag{14}$$

Then, for $K_2$, particular embodiments already have a pre-computed value of the correction grids parameterized by A, b, and may use the displacement $\delta_u$, $\delta_v$, to directly lookup the correction as follows:

$$\hat{I}_{K2}(u, \ v) = A((u \pm \delta_u)', (v \pm \delta_v)', I_{K2}(u, v)') \cdot I_{K2}(u, v) + \tag{15}$$

$$b((u \pm \delta_u)', (v \pm \delta_v)', I_{K2}(u, v)')$$

The offset may be used to lookup the correction for additional image frames as long as there is not a requirement to compute a new keyframe. A new keyframe can be computed based on whether the content of the video frames change significantly. An example of such a case would be when the face landmarks are not within the bounds of the image, or when the face's head pose is significantly different from the head pose of the keyframe, or every N frames, etc.

Particular embodiments may train a machine-learning model without ground truth image/video inputs for modifying illumination in video frames. Given that a video is made up of individual image frames, each keyframe may be used as input to the machine learning model, which computes the modified illuminations (e.g., corrections and/or enhancements) for those keyframes. For other video frames that are not keyframes, particular embodiments track the landmarks and compute their displacements from the keyframe, and accordingly compute the illumination corrected/enhanced result based on equation 15.

In instances when facial landmarks are sparse, particular embodiments may interpolate the displacement for all pixels bounded by the convex hull of the landmarks and estimate the illumination correction coefficients. The loss function L is computed by taking the linear combination of loss between the initial keyframe and the reconstructed keyframe, and the pairwise smoothness loss across all subsequent corrected/enhanced frames such that all the landmarks across these frames are aligned denoted by H, as the corrected and/or enhanced illumination output should be consistent and smooth across video frames. The loss function for video may be represented as follows:

$$L = \alpha \|I_{K1.} - I'_{K1}\| + \beta \sum_{i,j=2}^{i,j<N} H(\hat{I}_i, \hat{I}_j) \qquad (16)$$

where $\alpha$, $\beta$ are scalars in the range 0-1 that control the contribution of each of the terms to the loss function.

$$I_{K1}, I'_{K1}$$

are the input and reconstructed keyframes, respectively, and $\hat{I}_i$ is the i corrected/enhanced video frames that are not keyframes. N is the number of frames between keyframes. As a result, the machine-learning model learns a consistent illumination correction/transformation that provides temporally smooth results.

FIG. 2 illustrates an example method for training a machine-learning model that modifies facial illumination in images without requiring paired ground-truth data. Since paired ground-truth data does not need to be generated, the method of FIG. 2 significantly reduces the technical challenges and resources required to train a machine-learning model that modifies illumination of faces in images.

Figure 3:
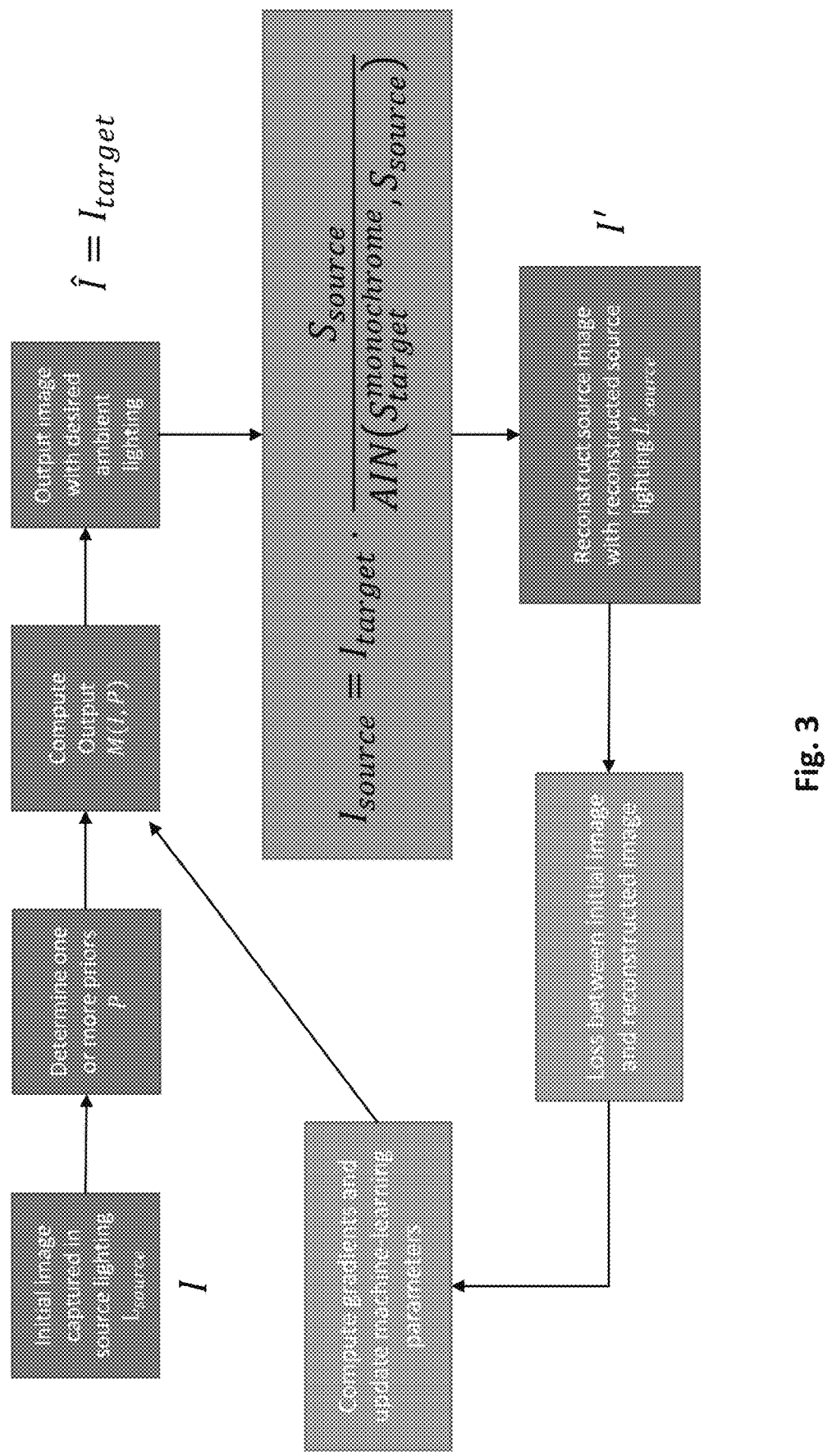
FIG. 3 illustrates an example approach for training a machine-learning model for modifying a facial illumination in an image.

Step 205 of the example method of FIG. 2 includes accessing an initial image that includes a human face having an initial illumination. As illustrated in FIG. 3, which illustrates an example approach for training a machine-learning model for modifying a facial illumination in an image, the initial image may be captured with source lighting $L_{source}$, for example as discussed above. In particular embodiments, step 205 may include capturing the initial image, e.g., with a camera that is part of an electronic device executing the method of FIG. 2. In particular embodiments, step 205 may include accessing an initial image from a memory of a client or a server computing device, and may include receiving the image from another electronic device, such as over a Wi-Fi or Bluetooth connection. In particular embodiments, the step of the example method of FIG. 2 may be performed by a single computing device, or may be performed by more than one computing device. In addition, this disclosure contemplates that more than one human face may be included in the initial image accessed in step 205. In particular embodiments, the steps described herein may be applied to some or all of multiple human faces in an image, such that "a human face" and "the human face" as used in describing these steps may refer to multiple human faces in the image.

Step 210 of the example method of FIG. 2 includes determining one or more illumination priors for the initial image. As explained above, such priors may include shading, surface normal, and/or lighting for a human face in the initial image.

Step 215 of the example method of FIG. 2 includes providing the initial image and the one or more illumination priors to a machine-learning model. For example, the machine-learning model may be a neural network, such as for example the corrections neural network illustrated in FIG. 1. As illustrated in FIG. 3, the machine-learning model computes the output M (I,P), as described above.

Step 220 of the example method of FIG. 2 includes receiving, from the machine-learning model, a set of correction operators identifying a modified illumination for the human face. For example, as explained above, the correction operators may be a set A, b that describes the illumination modifications to be made to the initial image. As described herein, the output from the machine-learning model identifies illumination modifications to the human face in the initial image. Step 225 of the example method of FIG. 2 includes creating, based at least on the set of correction operators and the input (i.e., initial) image, a modified image having the modified illumination (i.e., the illumination as determined by applying the correction operators to the input image). Once the modified image is obtained, step 230 of the example method of FIG. 2 includes creating, based on the modified image, a reconstructed initial image I' that includes the human face having a reconstructed illumination. For example, the reconstructed image may be determined according to equation 10, with (in particular embodiments) a chromatically correct shading used for $S_{target}$, for example according to the AIN formulation illustrated in equation 12, as shown in FIG. 3.

Step 235 of the example method of FIG. 2 includes adjusting one or more parameters of the machine-learning model by minimizing a loss function based on a difference between the initial image with the initial illumination and the reconstructed image (i.e., reconstructed initial/input image) with the reconstructed illumination. For example, as illustrated in FIG. 3, a gradient-descent approach may be used to minimize the loss function, and the parameters of the machine-learning model are updated accordingly. In particular embodiments, the loss function of step 235 of the example method of FIG. 2 operates on the initial image and the reconstructed images themselves, for example as illustrated in Eq. 11. In particular embodiments, the loss function of step 235 of the example method of FIG. 2 operates on a subset of information defining the images, although this approach may lead to coarser results. As illustrated in FIG. 3, the initial image then again input to the machine-learning model having its updated parameters, and the training process repeats for some number of iterations for each initial image, for example until a change in the loss function between iterations is below some threshold.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, such as the computer system of FIG. 5, this disclosure contemplates any suitable combination of any suitable components, devices, or systems carrying out any suitable steps of the method of FIG. 2. Moreover, this disclosure contemplates that some or all of the computing operations described herein, including the steps of the example method illustrated in FIG. 2, may be performed by circuitry of a computing device, for example the computing device of FIG. 5, by a processor coupled to non-transitory computer readable storage media, or any suitable combination thereof.

FIG. 4 illustrates an example method of modifying the illumination of a human face in an initial image, using a machine-learning model that is trained without using ground-truth training data. For example, the machine-learning model may be trained according to the example method described with respect to FIG. 2.

Step 405 of the example method of FIG. 4 includes accessing an input image including a human (or hominid) face having an initial (or starting) illumination. As described above in connection with step 205 of the example method of FIG. 2, accessing an image may include capturing the image and/or receiving the image from another computing device. Moreover, as described above with respect to FIG. 2, this disclosure contemplates that the initial (or input) image may include more than one human (or hominid) face, and therefore that "a human face" or "the human face" as used in this description of FIG. 4 may refer to more than one human (or hominid) face, in particular embodiments. In particular embodiments, and as described more fully above, the method of FIG. 4 may include accessing relevant image priors either extracted from the image or provided by the user, or both.

Step 410 of the example method of FIG. 4 includes determining, by a machine-learning model trained to modify facial illumination without using ground-truth training data, an illumination modification to the initial (or starting) illumination. For example, as described above, the trained machine-learning model may output a set of correction operators that identify the illumination modification. As described herein, the illumination modification may be a correction to illumination in the initial (or input) image and/or may be an enhanced illumination, such as a directional or cinematic illumination modification. In particular embodiments, the illumination may be selected by a user. For example, a set of enhanced illuminations may be presented to the user, and the user may select which one(s) of the enhanced illuminations to introduce to the initial (or input) image.

Step 415 of the example method of FIG. 4 includes creating an output image that includes the human (or hominid) face illuminated as modified by the illumination modification. In particular embodiments, the output image may be displayed to a user, e.g., on a display of a client computing device such as a smartphone. In particular embodiments, the output image may be stored in a memory of one or more computing devices, such as in a memory of a client computing device or a server computing device, or both.

In particular embodiments, the method of FIG. 4 may be performed upon a user request. In particular embodiments the method of FIG. 4 may be performed automatically, e.g., for each image in a collection, such as some or all images associated with the user's account, some or all images stored on a user's client device, or some or all images within a particular album or group of albums.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, such as the computer system of FIG. 5, this disclosure contemplates any suitable combination of any suitable components, devices, or systems carrying out any suitable steps of the method of FIG. 4. Moreover, this disclosure contemplates that some or all of the computing operations described herein, including the steps of the example method illustrated in FIG. 4, may be performed by circuitry of a computing device, for example the computing device of FIG. 5, by a processor coupled to non-transitory computer readable storage media, or any suitable combination thereof.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method of training a machine-learning model for modifying a facial illumination in an image, comprising:

accessing an initial image comprising a human face having an initial illumination;

determining one or more illumination priors for the initial image;

providing the initial image and the one or more illumination priors to the machine-learning model;

receiving, from the machine-learning model, a set of correction operators identifying a modified illumination for the human face;

creating, based at least on the set of correction operators and the initial image, a modified image having the modified illumination;

creating, based on the modified image, a reconstructed initial image comprising the human face having a reconstructed illumination; and adjusting one or more parameters of the machine-learning model by minimizing a loss function based on a difference between the initial image with the initial illumination and the reconstructed initial image with the reconstructed illumination.

2. The method of claim 1, wherein the machine-learning model comprises a neural network.

3. The method of claim 2, wherein the machine-learning model comprises a lightweight neural network.

4. The method of claim 1, wherein the illumination priors comprise an initial shading for the human face, a set of surface normals for the human face, an albedo estimate, and the initial illumination.

5. The method of claim 1, wherein the set of correction operators comprise a set of correction operators A, b.

6. The method of claim 1, wherein the set of correction operators is based on a corrections grid determined by the machine-learning model.

7. The method of claim 6, wherein the corrections grid comprises a tensor having an adjustable number of pixel-illumination bins GD.

8. The method of claim 1, further comprising:

determining, from the modified illumination, a modified shading for the human face; and determining, from the modified shading for the human face, a chromatically correct shading for the human face.

9. The method of claim 1, wherein the modified illumination comprises a correction to the initial illumination.

10. The method of claim 1, wherein the modified illumination comprises one or more of an added directional lighting or an added cinematic lighting for the human face.

11. The method of claim 10, wherein the illumination priors further comprise a target directional lighting or a target cinematic lighting.

12. The method of claim 1, wherein the initial image comprises a keyframe of a video.

13. The method of claim 12, further comprising:

accessing a second frame of the video;

determining, based on a correction grid for the keyframe and a displacement of the human face in the second frame relative to the keyframe, a set of correction operators for the second frame of the video.

14. One or more non-transitory computer readable storage media embodying instructions and coupled to one or more processors that are operable to execute the instructions to train a machine-learning model for modifying a facial illumination in an image, comprising:

access an initial image comprising a human face having an initial illumination;

determine one or more illumination priors for the initial image;

provide the initial image and the one or more illumination priors to the machine-learning model;

receive, from the machine-learning model, a set of correction operators identifying a modified illumination for the human face;

create, based at least on the set of correction operators and the initial image, a modified image having the modified illumination;

create, based on the modified image, a reconstructed initial image comprising the human face having a reconstructed illumination; and adjust one or more parameters of the machine-learning model by minimizing a loss function based on a difference between the initial image with the initial illumination and the reconstructed initial image with the reconstructed illumination.

15. A method comprising:

accessing an input image comprising a hominid face having a starting illumination;

determining, by a machine-learning model trained to modify facial illumination without using ground-truth training data, an illumination modification to the starting illumination, wherein the machine-learning model trained to modify facial illumination without using ground-truth training data comprises a plurality of model parameters, the model parameters have been determined at least in part during training by:

receiving (1) an initial image comprising a human face having an initial illumination and (2) one or more illumination priors;

providing a set of correction operators comprising a modified illumination for the human face;

creating, based at least on the set of correction operators and the initial image, a modified image having the modified illumination;

creating, based on the modified image, a reconstructed initial image comprising the human face having a reconstructed illumination; and adjusting one or more of the plurality of model parameters by minimizing a loss function based on a difference between the initial image with the initial illumination and the reconstructed initial image of the human face with the reconstructed illumination, wherein the reconstructed initial image is based at least on the set of correction operators; and creating an output image comprising the hominid face illuminated as modified by the illumination modification.

16. The method of claim 15, wherein the hominid comprises a human.

17. The method of claim 15, wherein the illumination priors comprise an initial shading for the human face, a set of surface normals for the human face, an estimated albedo, and the initial illumination.

18. The method of claim 15, wherein the set of correction operators comprise a set of correction operators A, b.

19. The method of claim 15, wherein the set of correction operators is based on a corrections grid determined by the machine-learning model.

20. The method of claim 19, wherein the corrections grid comprises a tensor having an adjustable number of pixel-illumination bins GD.

21. The method of claim 15, wherein the machine-learning model comprises a neural network.

22. The method of claim 21, wherein the machine-learning model comprises a lightweight neural network.

23. The method of claim 15, further comprising:

determining, from the illumination modification, a modified shading for the hominid face; and determining, from the modified shading for the hominid face, a chromatically correct monochrome shading for the hominid face.

24. The method of claim 15, wherein the illumination modification comprises a correction to the starting illumination.

25. The method of claim 15, wherein the illumination modification comprises one or more of an added directional lighting or an added cinematic lighting for the hominid face.

26. The method of claim 25, wherein the illumination priors further comprise a target directional lighting or a target cinematic lighting.

27. The method of claim 15, wherein the input image comprises a keyframe of a video.

28. The method of claim 27, further comprising:

accessing a second frame of the video;

determining, based on the illumination modification for the input image and a displacement of the hominid face in the second frame relative to the keyframe, a second illumination modification for the second frame of the video.

29. One or more non-transitory computer readable storage media embodying instructions and coupled to one or more processors that are operable to execute the instructions to:

access an input image comprising a hominid face having a starting illumination;

determine, by a machine-learning model trained to modify facial illumination without using ground-truth training data, an illumination modification to the starting illumination, wherein the machine-learning model trained to modify facial illumination without using ground-truth training data comprises a plurality of model parameters, the model parameters have been determined at least in part during training by:

receiving (1) an initial image comprising a human face having an initial illumination and (2) one or more illumination priors;

providing a set of correction operators comprising a modified illumination for the human face;

creating, based at least on the set of correction operators and the initial image, a modified image having the modified illumination;

creating, based on the modified image, a reconstructed initial image comprising the human face having a reconstructed illumination; and adjusting one or more of the plurality of model parameters by minimizing a loss function based on a difference between the initial image with the initial illumination and the reconstructed initial image of the human face with the reconstructed illumination, wherein the reconstructed initial image is based at least on the set of correction operators; and create an output image comprising the hominid face illuminated as modified by the illumination modification.

30. The media of claim 29, wherein the hominid comprises a human.

*   *   *   *   *